United States Patent [19]

Brown et al.

[11] 4,113,452

[45] Sep. 12, 1978

[54] GAS/LIQUID SEPARATOR

[75] Inventors: Francis Barton Brown, La Crescenta; John W. Erickson, Huntington Beach, both of Calif.

[73] Assignee: Kobe, Inc., Huntington Park, Calif.

[21] Appl. No.: 768,581

[22] Filed: Feb. 14, 1977

Related U.S. Application Data

[63] Continuation-in-part of Ser. No. 600,844, Jul. 31, 1975, abandoned.

[51] Int. Cl.$^2$ ............................................. B01D 45/12
[52] U.S. Cl. ....................................... 55/203; 55/409; 233/47 R; 233/DIG. 1
[58] Field of Search .................. 210/360 A, 377, 381, 210/380 H, 77; 55/41, 184, 191, 186, 189, 199, 203, 409; 233/27, 31, 37, 43, DIG. 1, 46, 47 R

[56] References Cited

U.S. PATENT DOCUMENTS

| | | | |
|---|---|---|---|
| 426,275 | 4/1890 | Holt et al. | 233/23 R |
| 2,648,496 | 8/1953 | Cresswess | 55/203 |
| 3,765,602 | 10/1973 | Dorle et al. | 233/31 |
| 3,973,930 | 8/1976 | Burgess | 55/203 X |

*Primary Examiner*—John Adee

*Attorney, Agent, or Firm*—Christie, Parker & Hale

[57] ABSTRACT

A gas/liquid separator includes a housing and a rotatable degassing chamber in the housing. Liquid containing gas is fed into the housing and through an annular liquid inlet conduit which opens into the chamber. Degasified liquid is discharged from the rotating chamber through one or more discharge passages in the circumferential wall of the chamber due to centrifugal force on the liquid in the rotating chamber. An upstream portion of each discharge passage is farther radially from the chamber axis of rotation than is the exit port of the passage. This forms a column of liquid in each discharge passage which, in turn, provides a gas seal between the inside and the outside of the chamber to prevent separated gas from accompanying the liquid out of the chamber. In essence, the discharge passage incorporates a liquid sealed trap. In applications involving separation of gas from highly viscous liquids, such as drilling mud, the interior of the chamber can contain baffles which expose a large surface area of the liquid to the low pressure in the chamber. Gas withdrawn from the liquid flows from the chamber through an axial conduit within the annular liquid inlet conduit.

17 Claims, 4 Drawing Figures

GAS/LIQUID SEPARATOR

CROSS-REFERENCE TO RELATED APPLICATION

This is a continuation-in-part of application Ser. No. 600,844, filed July 31, 1975, now abandoned.

BACKGROUND OF THE INVENTION

This invention relates to apparatus for separating gas from liquids.

There are many instances where it is desired to separate gas from liquids. For example, a processing gas may be dissolved in a liquid, or a body of liquid may include entrained gas bubbles or have a surface froth of gas bubbles. In the oil and gas well drilling industry, for example, gas often becomes entrapped in drilling mud. Gas/liquid separators are commonly used to separate the gas from the liquid. Three-phase separators also are commonly used to separate gas, oil, and water, for example.

It is often desirable to rotate the liquid in a centrifugal gas/liquid separator so that the centrifugal acceleration produces a greater separating force between the liquid and the gas. It is also desirable that the centrifugal acceleration force the liquid out of the degassing chamber to atmospheric pressure without using a pump. In this instance, where the separated liquid is being forced out of the degassing chamber to atmospheric pressure, and the degassing chamber operates at a gas pressure below atmospheric pressure, it is necessary to prevent separated gas from accompanying the liquid forced out of the degassing chamber in order to maximize gas/liquid separator efficiency.

SUMMARY OF THE INVENTION

This invention, in a presently preferred embodiment, provides a gas/liquid separator having a rotatable degassing chamber within a housing. Liquid containing gas is fed into the housing and then to the interior of the chamber. The chamber includes at least one discharge passage for discharging liquid to the outside of the chamber due to centrifugal acceleration of the liquid in the rotating chamber. Each discharge passage has both a radially innermost wall and a radially outermost wall extending from an entrance port inside the chamber to an exit port outside the chamber. The radially innermost wall of the discharge passage has a portion upstream from the exit port which is radially farther from the chamber axis of rotation than is the radially outermost wall of the passage at the exit port. Centrifugal acceleration of the liquid in the chamber forms a column of liquid in each discharge passage which, in turn, provides a gas seal between the inside and the outside of the chamber. The gas seal prevents separated gas from accompanying the liquid forced out of the rotating chamber. Gas separated from the liquid is vented from the chamber separately from the discharged degassed liquid.

Thus, a pump is not required to remove liquid from the chamber because of the centrifugal acceleration provided by the rotating chamber; and the gas seal improves separation efficiency.

In one embodiment of the invention, liquid entering the rotating chamber is forced by centrifugal acceleration against the inner walls of a plurality of baffles contained within the chamber. Preferably, the baffles rotate with the chamber and provide an even distribution of liquid on the baffle walls. In one arrangement of the baffles, the baffles provide a tortuous and relatively thin flow path of liquid along the inner walls of the baffles from the center portion of the chamber toward its periphery. In another form of the invention, the baffles are in the form of a series of perforated hollow cylinders of progressively larger diameter projecting from the chamber end walls. These forms of the invention are especially useful in the degassing of highly viscous liquids, such as drilling mud, in that they produce a greater separating force between the liquid and the gas, and they maximize the surface area of liquid exposed to lower gas pressure in the degassing chamber.

These and other features and advantages of the present invention will be appreciated as the same become better understood by reference to the following detailed description and the accompanying drawings.

DRAWINGS

DETAILED DESCRIPTION

Figure 1:
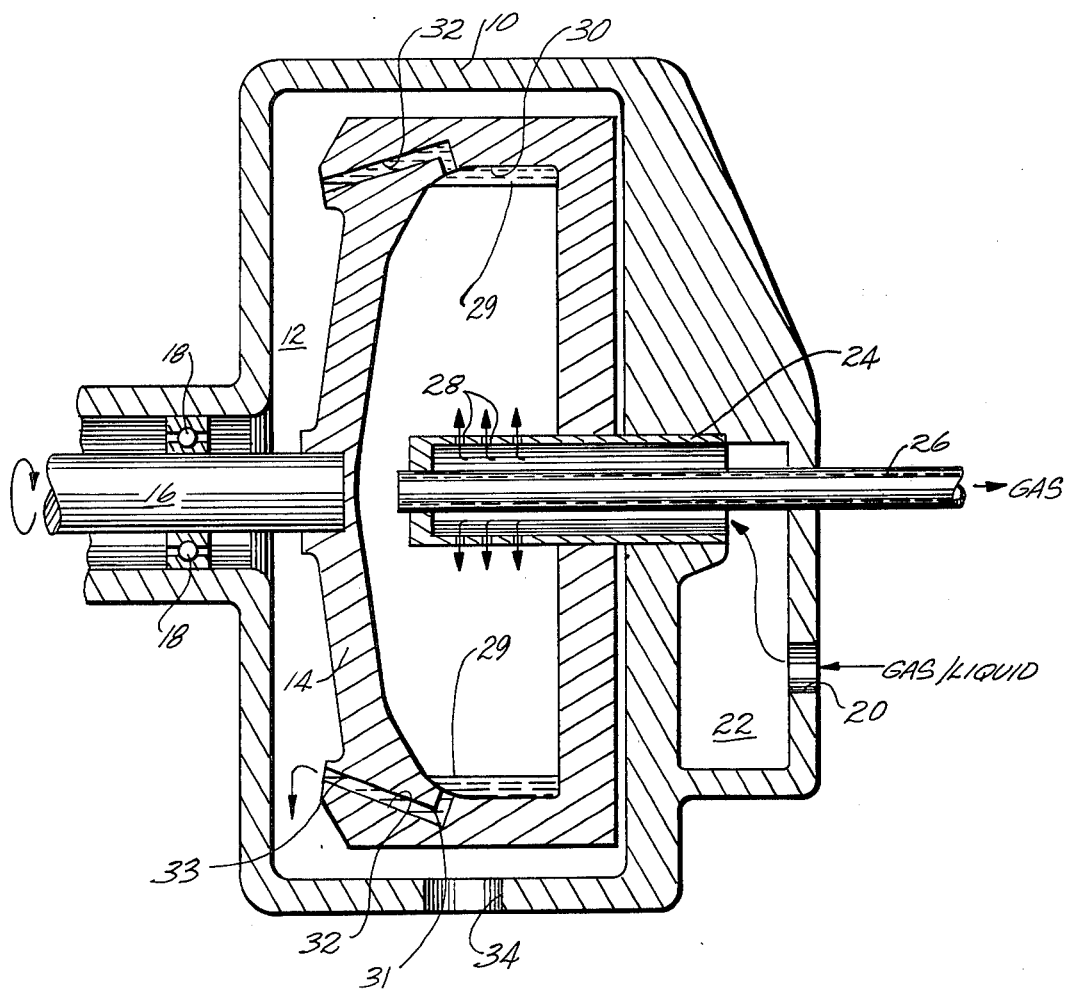
FIG. 1 shows a fragmentary longitudinal cross-section of a gas-liquid separator embodying principles of this invention.

Referring to FIG. 1, a gas/liquid separator includes a stationary housing 10 having a hollow interior space 12. A rotatable degassing chamber 14 rotates about its own horizontal axis in the interior of the housing. A horizontal drive shaft 16 supported by ball-bearings 18 rotates the degassing chamber about its axis.

Liquid containing gas enters an entrance opening 20 in the wall of the housing 10. The incoming liquid flows through a hollow liquid entrance channel 22 in the housing and into an axially extending, annular liquid flow conduit 24. An elongated gas flow pipe 26 is disposed axially within the liquid flow conduit 24, the gas flow pipe 26 and the liquid flow conduit 24 being coaxial with the axis of rotation of the chamber 14. The liquid flow conduit 24 is secured to the chamber 14 and rotates about its axis with rotation of the chamber. Seals, bearings and the like between the housing and rotation elements of the apparatus are omitted in the semi-schematic illustration of FIG. 1. The gas flow pipe 26 remains stationary during rotation of the chamber.

The liquid flow conduit 24 has a plurality of circumferentially spaced apart holes 28 leading to the central interior portion of the degassing chamber 14. The incoming liquid passes through the holes 28 into the rotating chamber. The liquid in the chamber is represented by reference numeral 29. When the liquid 29 enters the rotating degassing chamber 14, most of it is thrown by circumferential force toward the periphery of the chamber, where it is thrust against the circumferential wall 30 of the chamber.

At the circumferential wall 30 of the chamber 14, a plurality of discharge passages 32 exit into the open space 12 surrounding the chamber 14. The degassed liquid discharged from the passages 32 flows under gravity through the open space 12 and out through a liquid outlet 34. To prevent free gas from escaping through the discharge passages 32, each passage is formed so that an upstream portion of the passage is farther radially from the chamber axis of rotation than is the exit port of the passage. Each passage 32 has a radially innermost wall having a portion 31 that is radially further from the axis of rotation of the separator chamber 14 than is the radially outermost wall 33 at the discharge or exit port of the passage. Thus, a gas seal is formed by a column of liquid filling each discharge passage 32 during centrifugal acceleration of the chamber 14. The liquid surface cannot extend beyond the lip 33 of the exit port; the liquid thus closes the passage 32 adjacent the outermost portion 31 of the dogleg passage. The liquid discharge passages and the gas seal provided by them is further described below in the description of FIG. 2.

The gas seal provided by the discharge passages 32 has a number of advantages. For example, an expensive or unreliable pressure-actuated control valve or similar means is not required to prevent free gas from exiting the chamber 14. In addition, the liquid column which forms in each discharge passage 32 allows the degassing chamber to operate at a pressure somewhat lower than the pressure in the liquid discharge passage without requiring a pump to transfer the liquid out of the degassing chamber. Moreover, separation efficiency is improved because separated gas is prevented from accompanying separated liquid out of the chamber.

Gas removed from the separated liquid collects in the central interior portion of the chamber 14. The inner end of the gas flow pipe 26 terminates in this area of the chamber and provides an axial exit conduit for venting separated gas out of the separator to either be released to the atmosphere, collected, or further treated, for example.

Figure 2:
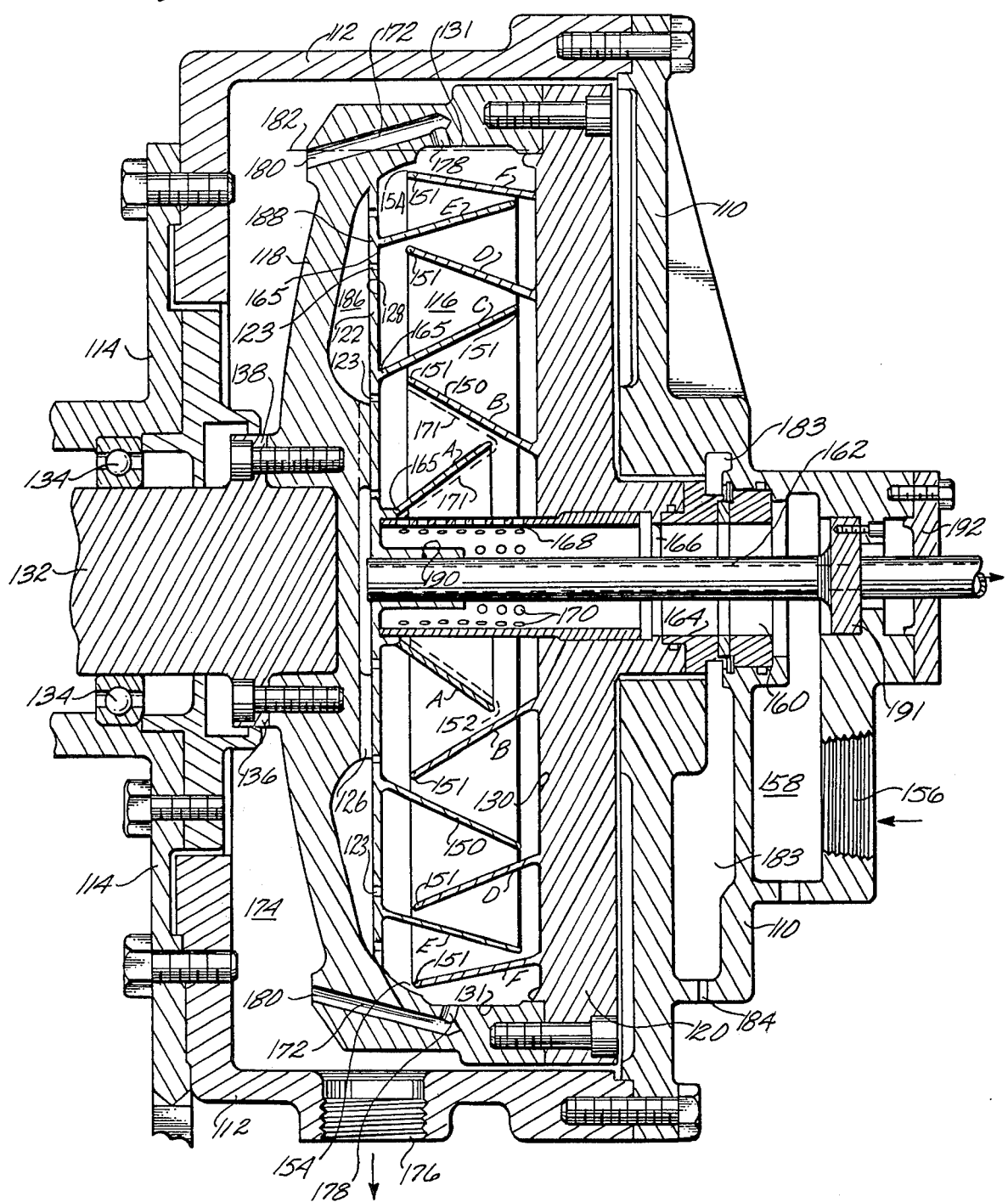
FIG. 2 shows a fragmentary longitudinal cross-section of an alternate gas/liquid separator embodying principles of this invention.

FIG. 2 shows a more detailed alternate embodiment of the gas/liquid separator of this invention. The separator shown in FIG. 2 includes a series of baffles located in the degassing chamber for increasing the gas/liquid separation force and for increasing the surface area of liquid exposed to the lower gas pressure in the rotating degassing chamber. A typical application of the gas/liquid separator of FIG. 2 is in the degassing of drilling mud, and the description with respect to FIG. 2 will be described in the context of separating gas from drilling mud.

The gas/liquid separator shown in FIG. 2 includes a housing comprising two housing halves bolted together, a circular housing half 110 and a bowl-shaped housing half 112. The housing is supported by a frame member 114 which is bolted to the bowl-shaped housing half 112. Within the housing is a rotatable vacuum degassing chamber 116 having a casing comprising a bowl-shaped casing member 118 and a dish-shaped casing member 120, mating surfaces of which are bolted together. The chamber 116 in operation rotates about its own horizontal axis. A vertical, flat, circular plate 122 perforated with gas venting holes 123 faces the dish-shaped casing member 118 and is supported toward its center by bosses 126 projecting from the bowl-shaped casing member and at its periphery by side walls of the bowl-shaped casing member. The degassing chamber 116 is defined by opposing, essentially flat, end walls 128, 130 and a circumferential wall 131. The end walls 128, 130 are the facing surfaces of the flat circular plate 122 and the dish-shaped member 120, respectively. The circumferential wall 131 is the side wall of the bowl-shaped casing member.

The degassing chamber 116 and its casing are rotated by a horizontal drive shaft 132. The drive shaft extends through the frame member 114 and is supported by ball-bearings 134 secured to the frame member 114. Other bearings (not shown) support the shaft so the chamber is cantilevered without bearings at the end remote from the shaft (bearings can be provided at the remote end if desired). The shaft has a flange 136 which abuts against an exterior mating projection 138 of the bowl-shaped casing member 118 to which it is bolted. The shaft projects into a circular indentation in the center of the outer wall of the bowl-shaped member to further secure the shaft to the chamber. Therefore, as the shaft 132 rotates about its axis, which is coaxial with the axis of the chamber, the degassing chamber also rotates.

A series of baffles 150 project from the end walls of the chamber. These baffles preferably are in the form of a series of baseless, hollow, truncated, right circular cones of progressively larger diameters. The central axis of each of the conical baffles is the same as the axis of rotation of the degassing chamber. The open bases of adjacent conical baffles face in opposite directions. The smaller ends of one set of baffles are closed by one end wall 128 of the chamber, and the smaller ends of the intervening baffles are closed by the opposite end wall 130; i.e., if the baffle closest to the axis of rotation is designated by letter A, the next closest by letter B, the next closest by letter C, etc., the smaller ends of baffles A, C, E, etc. are closed by the end wall 128 formed by the flat circular plate 122 and the smaller ends of baffles B, D, F, etc. are closed by the end wall 130 formed by the dish-shaped casing member 120. Thus, the baffles connected to one end wall are interleaved with the baffles connected to the opposite end wall. The edge 151 of the base of each baffle is spaced from the inner surface of the next outer baffle to form gaps 152. These gaps provide a tortuous and relatively thin flow path for the mud to flow from the center portion of the chamber toward its periphery. Likewise, there is a gap 154 between the lower end of the outermost baffle and the circumferential wall of the chamber.

Preferably, the baffle closest to the axis of rotation, baffle A, projects from end wall 128 with the gas venting holes 123. This configuration prevents mud entering the degassing chamber from being thrown directly into the gas venting holes 123 without being degassed. Instead, most of the mud entering the channel impinges against baffle A.

Preferably, the pitch of the walls of the baffles relative to the axis of rotation is not the same for all of the baffles. Because centrifugal force on the mud in the chamber increases as the mud flows toward the periphery of the chamber, less pitch for the outer conical baffles is required to assure good mud flow in the operation of this apparatus. Therefore, the pitch of each baffle is greater than the pitch of the next outer baffle. This configuration maximizes the length of the mud flow path and therefore maximizes the exposure of the mud to the vacuum in the degassing chamber in a given limited volume.

Mud enters the apparatus under pressure through a mud entrance 156 in the circular housing half 110. The mud flows radially through a mud entrance channel 158 formed by the walls of the circular housing half, and into an axially oriented annular mud flow conduit or channel 160, the inner wall of which is formed by the outer wall of a gas flow pipe 162 which is coaxial with the axis of rotation of the chamber. The outer wall of the annular conduit includes a conventional seal 164 and support rings 166. At the end adjacent the degassing chamber, the outer wall includes a mud flow pipe 168 having a plurality of holes 170 leading to the inside of the degassing chamber and through which the mud passes into the degassing chamber.

When mud enters the rotating degassing chamber, most of it is thrown by centrifgual force against the rotating inner surface of the first cone-shaped baffle A, thereby forming a thin film which exposes maximum surface area of the mud to the vacuum environment of the chamber. Because the base of the inner baffle is truncated, some of the mud is thrown directly against the inner surface of the second innermost baffle B. The mud flows under centrifugal force along the inner surface of each baffle to the inner surface of the next outermost baffle, passing through the gaps 152 between the baffles and eventually the outermost gap 154 between the edge of the base of the outermost baffle and the circumferential wall 131 of the chamber. For example, a thin mud layer 171 on the inner surface of baffle A flows axially and transversely along the wall of baffle A until it reaches the end of the baffle A. Then the mud, which is being propelled by centrifugal force due to the rotation of the degassing chamber, is thrust via gap 152 against the inner wall of baffle B, where it forms another thin layer. The mud flow continues from baffle to baffle until the mud reaches the periphery of the chamber, where it is thrust against the circumferential wall 131 of the chamber.

Degasified mud leaves the degassing chamber through a plurality of discharge passages 172 which lead into a mud flow space 174 between the outside wall of the chamber casing and the inner wall of the housing of the apparatus. Degasified mud then flows under the force of gravity to the mud exit 176, a port located at the base of bowl-shaped housing half 112, and from there typically to a mud storage pit (not shown).

The pressure in the rotating chamber is less than the pressure of the incoming mud and the pressure in the mud flow space 174 to maximize removal of gas from the mud. Typically, when the housing is at atmospheric pressure, the chamber is under a vacuum. It also is possible to operate the apparatus with the mud in both the mud flow space and the vacuum chamber at greater than atmospheric pressure.

The entry port 178 to each mud discharge passage 172 is on the circumferential wall 131 formed by the inner wall of the bowl-shaped casing member 118. The entrance portion of the passage is in a generally radial direction. The passage then doglegs in a generally axial direction, but slightly pitched toward the chamber axis of rotation. Enough pitch is provided so that the radially outermost wall of the exit 180 of the discharge passage is radially closer to the chamber axis of rotation than is a radially innermost wall of a portion of the discharge passage upstream from the exit 180. Because of this configuration, a column of degasified mud always remains along the circumferential wall of the degassing chamber, the height of the column being approximately equal to the radial distance between the entry port 178 and the exit 180 of the discharge passage, as indicated by phantom line 182, plus the difference in pressure between the pressure in the mud flow space and the lower pressure in the chamber. The mud discharge passage remains filled with mud during rotation of the chamber even if no mud flows, since centrifugal force cannot empty the passage in the portion radially outward from the exit. Thus, the mud passage acts much like the well known "P trap" under a sink. This mud column acts as a seal to prevent free gas from exiting the chamber through the mud path and allows the degassing chamber to operate at a pressure lower than the pressure in the mud discharge passage without requiring a pump to transfer the mud out of the degassing chamber.

Mechanical seals 164 keep incoming mud apart from degassified mud. Any small amount of mud passing through the seals enters a mud collector space 183 which leads to a drain 184 at the bottom of the circular housing half.

Gas is evacuated from the degassing chamber through the plurality of gas venting holes 123 in the end wall 128 of the chamber. There is at least one gas vent hole located radially between the edge 151 of the base of each baffle projecting from the opposite end wall 130 of the chamber and the portion 165 of the radially inner adjacent baffle adjacent to and projecting from the same end wall 128 or the chamber on which the gas vent hole is located. This insures that any gas withdrawn from the mud is quickly removed from the degassing chamber, thereby minimizing the pressure of the gas in the chamber.

There is a plenum 186 between the outer wall 188 of the flat circular plate 122 and the bowl-shaped casing member 118. The gas collects in this plenum and flows toward an axial exit conduit for the gas, the gas flow pipe 162. The gas flow pipe passes through the hole in the dish-shaped casing member 120 into the gas plenum 186 through an axial annular projection 190 of the chamber end wall 128. This pipe vents gas out of the apparatus to either be released to the atmosphere, collected, or further treated. The pipe is held in place by a bolted flange 191 and the end of the apparatus is closed by a circular cover plate 192 with a central hole through which the pipe projects. The cover plate is bolted to the circular housing half 110. The slight pressure of the mud entering the apparatus is sufficient to force the gas out of the apparatus. However, it is preferred that a vacuum source (not shown) be connected to the gas collection pipe 162 to improve the efficiency of the apparatus.

The axial annular projection 190 on the flat circular plate 122 rotates and serves as a labyrinth seal because it closely surrounds the stationary gas pipe 162, and therefore serves to prevent appreciable quantities of free gas from reentering the chamber or mud from leaking into the gas plenum.

In an exemplary embodiment of this invention the rotating chamber is about 18 inches in diameter and rotates at about 1800 rpm. In operation, such apparatus efficiently and economically degasses drilling mud. Because of the rapid rotation of the degassing chamber, great force is exerted on the mud in the chamber so that it flows rapidly therethrough and very thin layers are formed on the baffles. Thus, a maximum mud surface area is exposed to the vacuum in the degassing chamber. This combination of high centrifugal acceleration and thin layer results in optimum removal of gas from the mud. Also, because of the cone-like configuration of the baffles, a long flow path of mud is achieved in a small volume, thereby giving an optimum residence time for the mud in the degassing chamber. This also contributes to the efficiency of this apparatus.

A significant feature of this degasser which minimizes the amount of gas left in the mud after it is degassed is the configuration of the mud discharge passage from the degassing chamber. Because the exit of the discharge passage is radially closer to the axis of rotation than is its entrance, a mud seal is always present in the passage at the circumferential wall of the degassing chamber. This mud seal prevents free gas from leaving the degassing chamber with the degassed mud.

Figure 3:
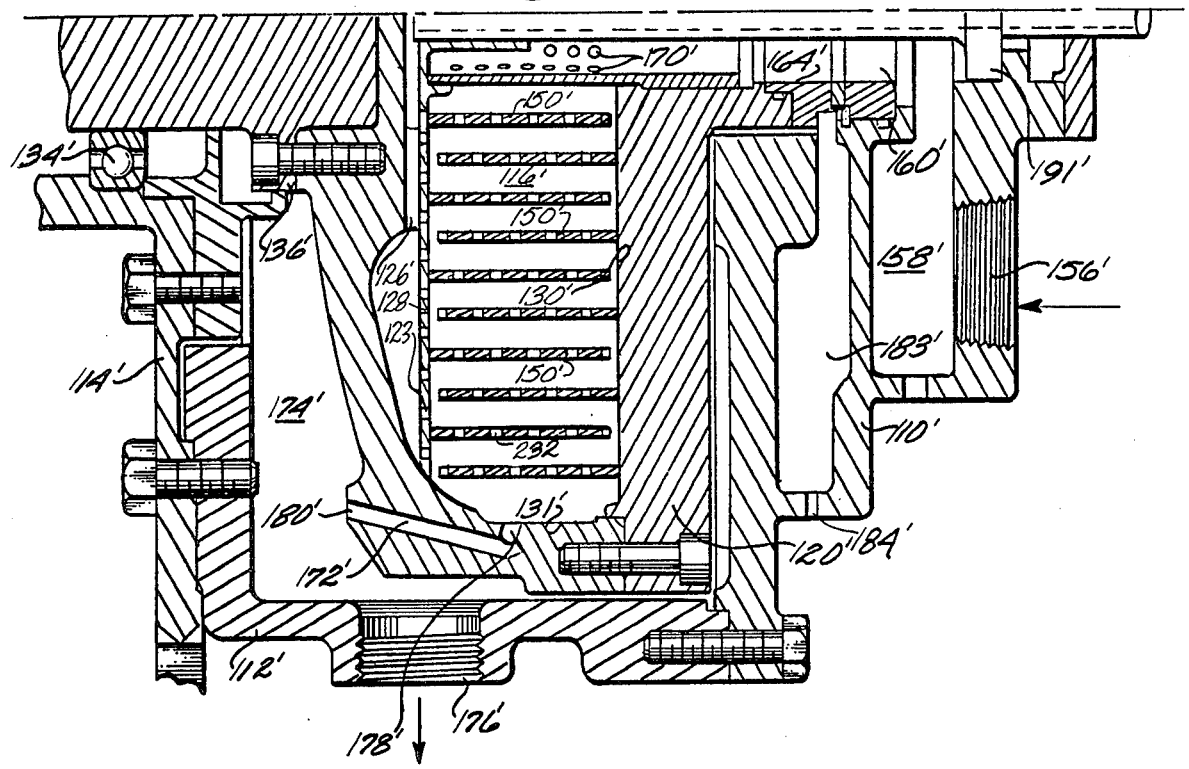
FIG. 3 shows half of a fragmentary longitudinal cross-section of another alternate gas/liquid separator embodying principles of this invention.

FIG. 3 depicts another embodiment of this invention differing from the apparatus of FIG. 2 only in the baffle configuration. The baffles 150' shown in FIG. 3 are in the form of a series of hollow cylinders of progressively larger diameter which are coaxial with the chamber. The baffles 150' extend from the end walls 128', 130' of the degassing chamber 116'. The baffles have perforations 232 through which liquid passes as it flows from the innermost baffle to the periphery of the chamber. The baffles 150' serve to increase the surface area of the liquid exposed to the vacuum in the chamber 116'.

Because the baffles shown in FIG. 3 are perpendicular to the end walls rather than pitched, as are the baffles shown in FIG. 2, viscous liquid can form a relatively thick layer on the baffles of FIG. 3. This increases residence time of the liquid in the degassing chamber. As the liquid passes through the perforations 232 and strikes the next outermost baffle, much surface area is exposed to the vacuum so that gas is easily withdrawn. The liquid flows in the apparatus of FIG. 3 just as in the apparatus of FIG. 2, i.e., the liquid is propelled from each baffle to the next outermost baffle by centrifugal force due to the rotation of the degassing chamber until it reaches the periphery of the chamber where it leaves the chamber through the plurality of discharge passages 172'.

Figure 4:
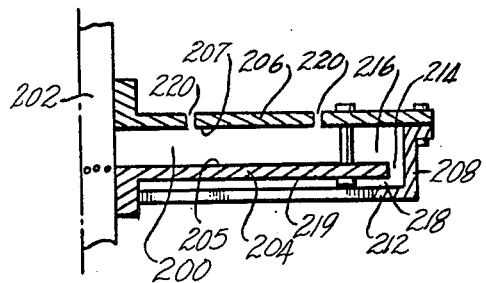
FIG. 4 shows a fragmentary longitudinal cross-section of a portion of a further alternate gas/liquid separator embodying principles of this invention.

FIG. 4 depicts an embodiment of the invention which has no baffles within the degassing chamber, a chamber rotating about a vertical axis, and a liquid discharge passage formed by the walls of the degassing chamber.

As shown in FIG. 4, a cylindrical degassing chamber 200 is attached to a vertical rotating shaft 202. Only half of the degassing chamber is shown in the drawing. The end walls of the chamber are formed by two flat circular plates of different diameters, a smaller plate 204 forming the bottom end wall 205 and a larger plate 206 forming the top end wall 207. The plates are bolted together. The circumferential wall of the degassing chamber 200 is formed by a circumferential ring 208. The ring 208 has a flange 210 which is bolted to the small plate 204 at its upper edge, and an inwardly directed projection 212 at its lower edge. The ring and bottom plate define a liquid discharge passage with an axially vented portion 214 between the end wall 216 of the smaller plate 204 and the inner wall of the circumferential ring 208. This axially directed portion 214 of the liquid discharge passage connects with a radially inwardly oriented portion 218 of the passage which is formed by the inner wall of the inwardly directed projection 212 and the outer wall 219 of the smaller plate 204. Because the upstream portion of the liquid discharge passage is radially farther from the axis of rotation of the chamber than is the downstream portion, the liquid seal is always present at the circumferential wall of the degassing chamber when it is rotating. This liquid seal prevents free gas from leaving the degassing chamber with the degassed liquid. It will be noted that just as in the embodiments of FIGS. 1, 2 and 3, the liquid first flows radially outwardly and then radially inwardly as it is discharged from the periphery of the degassing chamber.

Because the gas/liquid separator shown in FIG. 4 rotates about a vertical axis, a thin layer of liquid is formed on the bottom end wall 205 by the pull of gravity. Thus, baffles are not required to form thin layers of liquid. Furthermore, when the apparatus of FIG. 4 stops rotating, the liquid in the chamber drains out through the liquid discharge passage. Thus, liquid such as drilling mud, which can dry out and form solid cakes, is not left in an idle degasser to plug it.

Since the chamber rotates about a vertical axis, the gas venting holes 220 necessarily are in the top end wall 207 of the degassing chamber so that the gas can easily leave the chamber.

FIG. 4 shows only some of the features of a vertically oriented degasser. Thus, the means for feeding the liquid are not depicted, nor are the means for discharging gas. These can be similar to the arrangements in the embodiments of FIGS. 1, 2 and 3.

The embodiments of the degasser shown in FIGS. 1, 2 and 3 and described above are preferred examples of the best mode of practicing this invention. However, although the discharge passage has been shown and described with its exit port closer to the axis of rotation than its entrance port, this is only exemplary of configurations where an upstream portion of the liquid discharge passage is farther radially from the axis of rotation than is the exit port of the passage. For example, the liquid discharge passage can be semi-circular with its entry port radially closer to the axis of rotation than is its exit, but with some midpoint being farther radially from the axis of rotation than is the exit of the passage.

Furthermore, it is not necessary that the liquid discharge passage be transverse to the direction of rotation of the degassing chamber. The discharge passage can be along the circumference of the chamber with liquid flowing in the passage in the direction of rotation. Thus, the liquid would leave the passage under centrifugal force in a direction that adds the impulse of the liquid to the rotating chamber. This configuration would be akin to that of a turbine and would give a boost to efficiency.

Various other changes and modifications in the arrangement of parts and in the interconnection of components may be resorted to without departing from the spirit of the invention or the scope of the claims.

What is claimed is:
1. Apparatus for degasification of liquids comprising:
 a rotatable degassing chamber;
 means for feeding liquid containing gas into the chamber;
 means for venting gas from the chamber;
 a plurality of baffles within the chamber providing a flow path for the liquid comprising a series of truncated, baseless, hollow, coaxial right circular cones, coaxial with the chamber and with progressively larger diameters, the open bases of adjacent conical baffles facing in opposite directions, the smaller ends of one set of baffles closed by one end wall of the chamber, and the smaller ends of the intervening baffles closed by the opposite end wall, the edge of the base of each baffle interleaved with and spaced from the inner surface of the next outer baffle to provide a fluid flow path along the inner walls of the baffles; and a discharge passage from the rotatable chamber for discharging liquid from the inside of the chamber near a circumferential wall of the chamber to the outside of the chamber due to centrifugal acceleration of the chamber, the discharge passage having both a radially innermost wall and a radially outer most wall extending from an entrance port inside the chamber to an exit port outside the chamber, the radially innermost wall of the discharge passage having a portion upstream from said exit port which is radially farther from the chamber axis of rotation than is the radially outermost wall of said discharge passage at said exit port for forming a gas seal in the passage.

2. Apparatus according to claim 1 wherein the means for feeding liquid containing gas into the chamber comprises:
   a liquid entrance conduit;
   an axially oriented annular liquid flow conduit communicating with said entrance conduit; and
   a plurality of holes at an end of the liquid flow conduit leading to the inside of the degassing chamber.

3. Apparatus according to claim 2 wherein the gas venting means comprises an axial gas exit pipe, and wherein an inner wall of the annular liquid flow conduit is formed by the outer wall of the gas exit pipe.

4. Apparatus according to claim 1 wherein the means for venting gas comprises:
   an axial gas exit pipe;
   a series of gas vent holes in an end wall of the chamber; and
   a flow path leading from the gas vent holes to an end of the axial pipe.

5. Apparatus according to claim 1 wherein the rotatable degassing chamber is cylindrical with essentially flat end walls on the inside and a diameter larger than its length.

6. Apparatus according to claim 1 wherein the entrance port to said discharge passage is on the circumferential wall of the degassing chamber, the discharge passage having an entrance portion extending in a generally radial direction from said entrance port; and in which the discharge passage further has a discharge portion which doglegs in a direction which is generally axial but slightly pitched toward the chamber axis of rotation.

7. Apparatus according to claim 1 wherein the pressure in the degassing chamber is less than the pressure in the exit of the discharge passage.

8. An apparatus for degasification of liquids comprising:
   (a) a rotatable degassing chamber;
   (b) a plurality of baffles within the chamber providing a flow path for the liquid comprising a series of truncated, baseless, hollow, coaxial right circular cones, coaxial with the chamber and with progressively larger diameters, the open bases of adjacent conical baffles facing in opposite directions, the smaller ends of one set of baffles closed by one end wall of the chamber, and the smaller ends of the intervening baffles closed by the opposite end wall, the edge of the base of each baffle interleaved with and spaced from the inner surface of the next outer baffle to provide a fluid flow path along the inner walls of the baffles;
   (c) means for feeding liquid containing gas into the chamber;
   (d) means for venting gas from the chamber; and
   (e) means for discharging the degassed liquid from the chamber.

9. Apparatus according to claim 8 wherein the pitch of the walls of each cone relative to the axis of rotation is greater than the pitch of the next outermost cone.

10. Apparatus according to claim 8 wherein the means for discharging liquid from the interior of the chamber comprises a discharge passage where a portion of the passage upstream from the exit of the passage is radially farther from the axis of rotation of the chamber than is its exit.

11. Appartus according to claim 2 wherein the means for venting gas comprises:
    an axial gas exit pipe;
    a series of gas vent holes in an end wall of the chamber; and
    a flow path leading from the gas vent holes to an end of the axial pipe.

12. Apparatus according to claim 17 wherein at least one gas vent hole is located radially between the edge of the base of each baffle projecting from the opposite end wall of the chamber and the portion of the radially inner adjacent baffle adjacent to and projecting from the same end wall of the chamber on which the gas vent hole is located.

13. Apparatus according to claim 11 wherein the small end of the radially innermost baffle is closed by the end wall with the series of gas vent holes.

14. Apparatus according to claim 8 wherein the baffles provide a tortuous flow path of liquid through the chamber.

15. In a gas/liquid separator having a rotatable degassing chamber with means for feeding liquid to the chamber and means for venting gas from the chamber, improved means for discharging the degassed liquid from the degassing chamber wherein the improvement comprises a discharge passage having an entry port inside the chamber and an exit port outside the chamber, the discharge passage having at least a portion radially farther from the chamber axis of rotation than is the exit port of said discharge passage for forming a gas seal in the discharge passage, the degassing chamber containing means for providing a flow path for liquid comprising a series of truncated, baseless, hollow, coaxial right circular cones coaxial with the chamber and with progressively larger diameters, the open bases of adjacent conical baffles facing in opposite directions, the smaller ends of one set of baffles being closed by one end wall of the chamber and the smaller ends of the intervening baffles being closed by the opposite end wall, the large edge of the base of each baffle being interleaved with and spaced from the inner surface of the next outer baffle.

16. A gas/liquid separator comprising:
    (a) a casing;
    (b) a rotatable degassing chamber within the casing;
    (c) an axial gas exit pipe for venting gas from the chamber;
    (d) an axially oriented annular liquid flow conduit having an inner wall formed by an outer wall of the axial gas exit pipe, including means for feeding liquid to the inside of the degassing chamber;
    (e) discharge passages with entry ports on the circumferential wall of the chamber for discharging degassed liquid from the chamber, wherein an entrance portion of each passage extends in a generally radial direction, and a discharge portion of each passge doglegs in a direction which is generally axial but slightly pitched toward the chamber axis of rotation so that an exit port of each passage is radially closer to the chamber axis of rotation than is the entry port of the passage to form a gas seal in each discharge passage;

(f) a liquid flow space between an outer wall of the chamber and an inner wall of the casing, and a port located at the base of the casing for discharging degassed liquid from the separator;

(g) baffle means in the degassing chamber for providing a tortuous flow path for the liquid within the chamber; and (h) a series of gas vent holes in an end wall of the chamber wherein at least one gas vent hole is located radially between an edge of the base of each baffle projecting from the opposite end wall of the chamber and the portion of the radially inner adjacent baffle adjacent to and projecting from the same end wall of the chamber on which the gas vent hole is located; and in which said flow path leads from the gas vent holes to an end of the axial pipe to vent the gas from the separator.

17. A gas/liquid separator comprising:

(a) a casing;

(b) a rotatable degassing chamber within the casing;

(c) an axial gas exit pipe for venting gas from the chamber;

(d) an axially oriented annular liquid flow conduit having an inner wall formed by an outer wall of the axial gas exit pipe, including means for feeding liquid to the inside of the degassing chamber;

(e) discharge passages with entry ports on the circumferential wall of the chamber for discharging degassed liquid from the chamber, wherein an entrance portion of each passage extends in a generally radial direction, and a discharge portion of each passage doglegs in a direction which is generally axial but slightly pitched toward the chamber axis of rotation so that an exit port of each passage is radially closer to the chamber axis of rotation than is the entry port of the passage to form a gas seal in each discharge passage;

(f) a liquid flow space between an outer wall of the chamber and an inner wall of the casing, and a port located at the base of the casing for discharging degassed liquid from the separator; and (g) a plurality of baffles in the degassing chamber for providing a tortuous flow path for the liquid within the chamber, the baffles comprising a series of truncated, baseless, hollow, coaxial right circular cones, coaxial with the chamber and with progressively larger diameters, the open bases of adjacent conical baffles facing in opposite directions, the smaller ends of one set of baffles closed by one end wall of the chamber, and the smaller ends of the intervening baffles closed by the opposite end wall, the smaller end of the radially inward baffles closed by the perforated end wall, the larger edge of the base of each baffle interleaved with and spaced from the inner surface of the next outer baffle to provide a liquid flow path along the inner walls of the baffles.--

* * * * *

UNITED STATES PATENT AND TRADEMARK OFFICE
CERTIFICATE OF CORRECTION

PATENT NO. : 4,113,452
DATED      : September 12, 1978
INVENTOR(S) : FRANCIS BARTON BROWN ET AL It is certified that error appears in the above-identified patent and that said Letters Patent are hereby corrected as shown below:

Column 10, line 12, "Appartus" should read -- Apparatus --;
(Claim 11)          "2" should read -- 8 --.

Column 10, line 19, "17" should read -- 11 --.
(Claim 12)

Column 10, line 68, "passge" should read -- passage --.
(Claim 16)

Signed and Sealed this

Sixteenth Day of January 1979

[SEAL]

Attest:

RUTH C. MASON
*Attesting Officer*

DONALD W. BANNER
*Commissioner of Patents and Trademarks*